United States Patent [19]

Moses

[11] Patent Number: 5,520,542
[45] Date of Patent: May 28, 1996

[54] GAMES FOR ENHANCING MATHEMATICAL UNDERSTANDING

[76] Inventor: Robert P. Moses, 73 School St., Cambridge, Mass. 02139

[21] Appl. No.: 371,074

[22] Filed: Jan. 10, 1995

[51] Int. Cl.⁶ .............................. G09B 1/00; G09B 19/00; G09B 23/02
[52] U.S. Cl. ........................................... 434/209; 434/207
[58] Field of Search .................................. 434/207, 209, 434/205, 188; 273/299, 302

[56] References Cited

U.S. PATENT DOCUMENTS

| | | | |
|---|---|---|---|
| 1,415,019 | 5/1922 | Crossland | 434/209 |
| 1,694,405 | 12/1928 | Troidl | 434/207 |
| 2,839,844 | 6/1958 | Lahnkering | 434/209 |
| 4,512,746 | 4/1985 | Turner | 434/209 |
| 5,083,793 | 1/1992 | Sanford | 434/207 |
| 5,242,171 | 9/1993 | Hata | 434/207 |
| 5,318,447 | 6/1991 | Mooney | 434/209 |

*Primary Examiner*—Paul J. Hirsch
*Attorney, Agent, or Firm*—Millen, White, Zelano, & Branigan

[57] ABSTRACT

A game for enhancing mathematical skills is played in the a classroom with teams of players or individual players. The game utilizes a branched lattice having a central starting point and a plurality of terminal points. The lattice is placed on the floor of a classroom. In playing the game, students select three numbers from a location on the classroom wall and factor those three numbers to find the prime factors of the numbers, which prime factors are then recorded in input/output tables. The tables have an output line or column in which the output value "−1" is written if the number of factors is odd; the output value "0" is written if the output value includes repeated primes, indicating raising a prime to a power; and the output value "+1" is written if the number of prime factors is even. The output values are used to locate the input/output tables, which are on slips of paper, at correct terminal points of the lattice. The path to each of the terminal points comprises three legs of the lattice, with each of the legs being defined by one of the output values "−1," "0" and "+1." A frequency table is provided to retire the number chips in columns in accordance with their output values. In accordance with additional embodiments of the invention, the game is played in combination with a Venn diagram puzzle having color chips which are assembled in accordance with the results of casting color-coded dice. In accordance with still further embodiments of the invention, the lattice is configured as a three-dimensional, color-coded array, with legs extending parallel to one another being of the same color.

16 Claims, 20 Drawing Sheets

| INPUT | PRIME FACTORS | OUTPUT |
|---|---|---|
| 30 | 3 x 2 x 5 | -1 |
| 15 | 3 x 5 | +1 |
| 8 | 2 x 2 x 2 | 0 |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

| INPUT | PRIME FACTORS | OUTPUT |
|---|---|---|
| | | |
| | | |
| | | |

FIG. 4a      FIG. 4b

SCORE SHEET

| FLAG INFORMATION | | FLAG | FLAGWAY | FREQ. STAND |
|---|---|---|---|---|
| INPUT | OUTPUT | | | |
| 30 | -1 | 10 | 10 | 10 |
| | | | | |
| | | | | |
| | | | | |
| | | | | |
| | | | | |
| | | | | |
| | | | | |

FIG. 7

| LATTICE ROUTE CHART ||||||
|---|---|---|---|---|---|
| ROUTES | TEAM | ROUTES | TEAM | ROUTES | TEAM |
| 0 0 0 |  | +1 0 0 |  | -1 0 0 |  |
| 0 0 +1 |  | +1 0 +1 |  | -1 0 +1 |  |
| 0 0 -1 |  | +1 0 -1 |  | -1 0 -1 |  |
| 0 +1 0 |  | +1 +1 0 |  | -1 +1 0 |  |
| 0 +1 +1 |  | +1 +1 +1 |  | -1 +1 +1 |  |
| 0 +1 -1 |  | +1 +1 -1 |  | -1 +1 -1 |  |
| 0 -1 0 |  | +1 -1 0 |  | -1 -1 0 |  |
| 0 -1 +1 |  | +1 -1 +1 |  | -1 -1 +1 |  |
| 0 -1 -1 |  | +1 -1 -1 |  | -1 -1 -1 |  |

FIG. 8
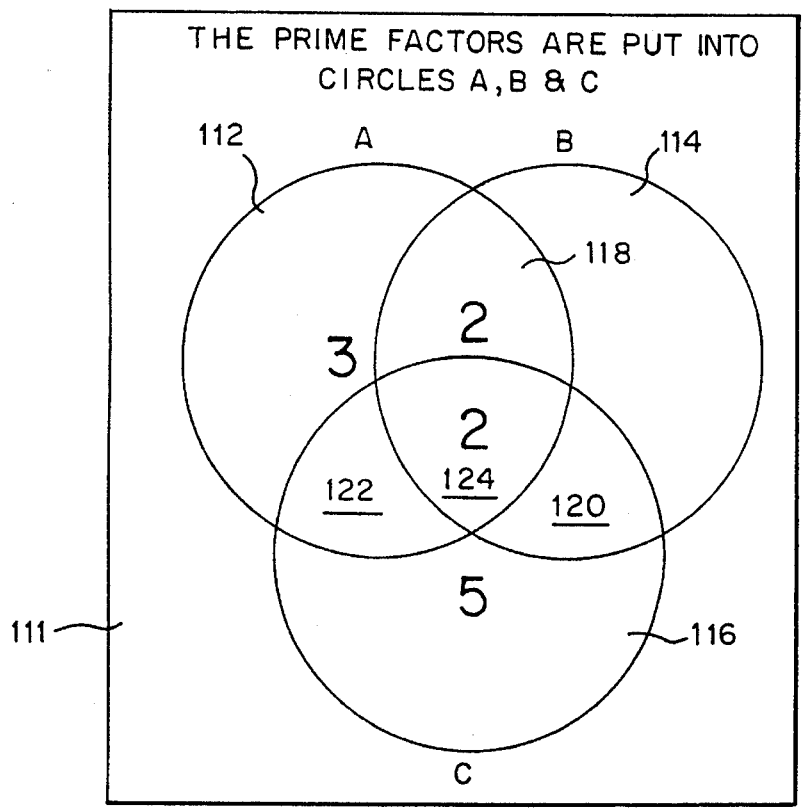
FIG. 9
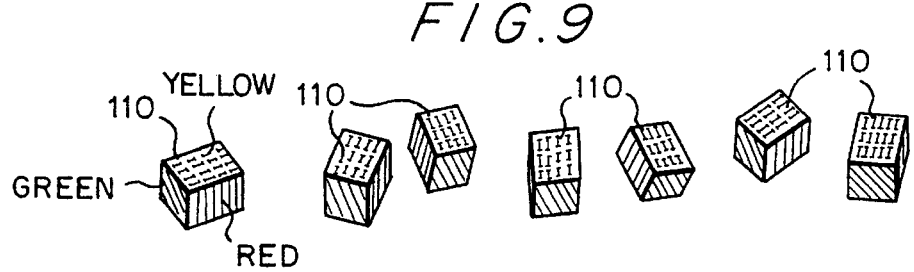
FIG. 10
| CIRCLES | A | B | C |
|---|---|---|---|
| USE EXPONENTS | $3 \cdot 2^2$ | $2^2$ | $2 \cdot 5$ |
| MULTIPLY | 3 x 2 x 2 | 2 x 2 | 2 x 5 |
| PRODUCT | 12 | 4 | 10 |
| OUTPUT | 0 | 0 | +1 |

| INPUT | PRIME FACTORIZATION | ALGEBRA FORM | OUTPUT |
|---|---|---|---|
| 12 | $2 \times 2 \times 3 = (2^2)(3)$ | $a^2 b$ | 0 |
| 30 | $2 \times 5 \times 3 = (2)(5)(3)$ | $a b c$ | -1 |
| 21 | $7 \times 3 = (7)(3)$ | $a b$ | +1 |
| 18 | $3 \times 3 \times 2 = (3^2)(2)$ | $a^2 b$ | 0 |
| 19 | $19 = 19$ | $a$ | -1 |
| 210 | $2 \times 5 \times 3 \times 7 = (2)(5)(3)(7)$ | $a b c d$ | +1 |
| 32 | $2 \times 2 \times 2 \times 2 \times 2 = 2^5$ | $a^5$ | 0 |
| 9 | $3 \times 3 = 3^2$ | $a^2$ | 0 |
| 51 | $3 \times 17 = (3)(17)$ | $a b$ | +1 |

| CIRCLES | A | B | C |
|---|---|---|---|
| PRIMES | 2·3·5 | $2^2$ | 2·3 |
| PRODUCT | 2 × 3 × 5 | 2 × 2 | 2 × 3 |
| INPUT | 30 | 4 | 6 |
| OUTPUT | −1 | 0 | +1 |

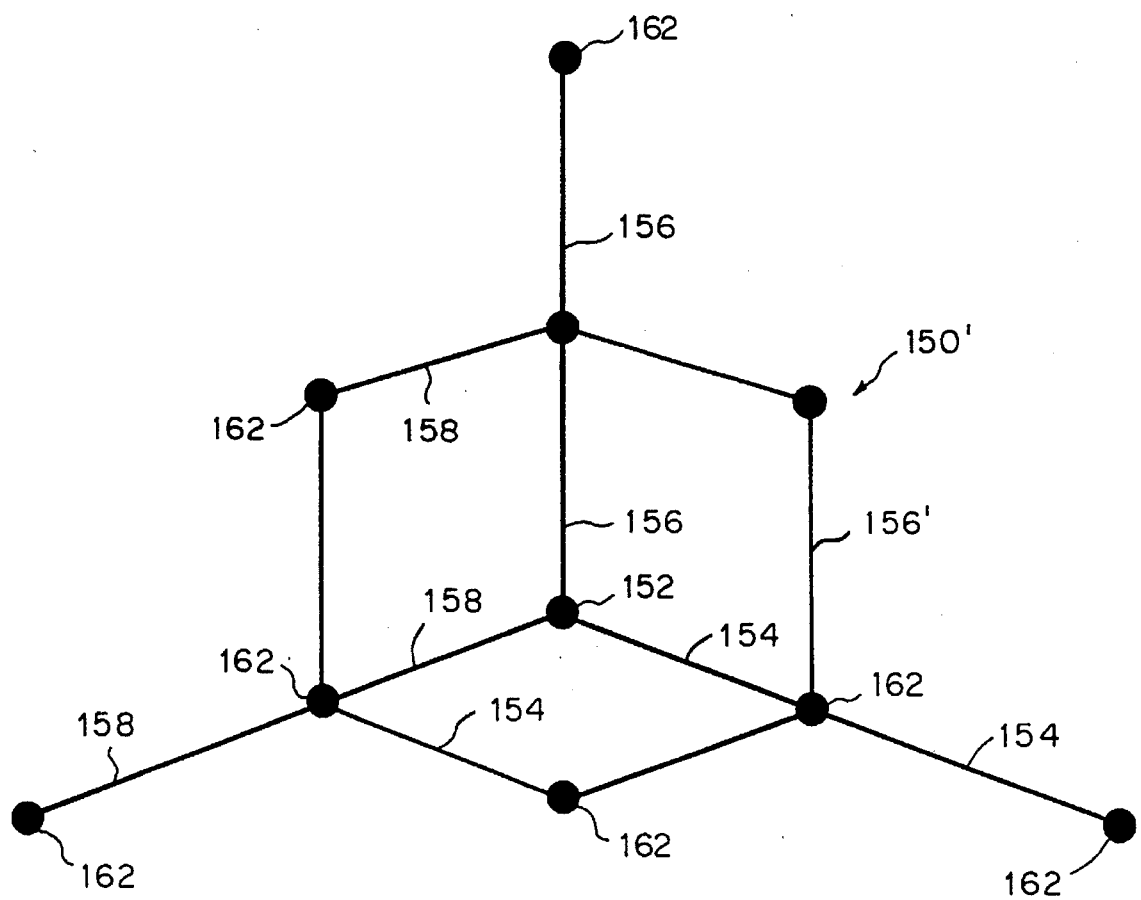
F I G. 16

X

Y          Z

LOCATION ON 3-D LATTICE

NUMBER OF FLAGS

| CIRCLES | A | B | C |
|---|---|---|---|
| PRIMES | 5 | 3 | 2 |
| PRODUCT | 5 | 3 | 2 |
| INPUT | 5 | 3 | 2 |
| OUTPUT | -1 | -1 | -1 |

| CIRCLES | A | B | C |
|---|---|---|---|
| PRIMES | 5 · 2 | 2 · 3 | 3 · 5 |
| PRODUCT | 5 x 2 | 2 x 3 | 3 x 5 |
| INPUT | 10 | 6 | 15 |
| OUTPUT | +1 | +1 | +1 |

$$x^2(X+Y+Z)+Y^2(X+Y+Z)+Z^2(X+Y+Z)$$
$$=(X^2+Y^2+Z^2)(X+Y+Z)$$

$X+Y+Z$ $$(Y+Z)(Y+Z)$$
$$=Y(Y+Z)+Z(Y+Z)$$
$$=Y^2+YZ+ZY+Z^2$$

$(X+Y)(X+Y)$
$=X(X+Y)+Y(X+Y)$
$=X^2+XY+YX+Y^2$ $XY(X)+XY(Y)+XY(Z)$
$=XY(X+Y+Z)$ $(X+Y+Z)(X+Y+Z)$
$=X(X+Y+Z)+Y(X+Y+Z)+Z(X+Y+Z)$
$=(X^2+XY+XZ)+(YX+Y^2+YZ)+(ZX+ZY+Z^2)$ $X(X^2)+X(Y^2)+X(Z^2)+X(XY)+X(YX)+X(XZ)$
$+X(ZX)+X(YZ)+X(ZY)$
$=X(X+Y+Z)^2$

GAMES FOR ENHANCING MATHEMATICAL UNDERSTANDING

FIELD OF THE INVENTION

The present invention is directed to games for enhancing mathematical understanding. More particularly, the present invention is directed to games for enhancing mathematical understanding which are particularly useful in teaching students concepts necessary for understanding algebra.

BACKGROUND OF THE INVENTION

Classical algebra is a generalization of arithmetic in which symbols are utilized for unknown numbers. The principles of classical algebra were synthesized in the 9th Century A.D. from earlier understandings by Abu Jáfar Muhammad ibn Músa Al-Khwarizm. Algebra spread subsequently from Northwest Africa to what is now Spain, from Spain throughout Europe, and from Europe to substantially the entire world.

Algebra and its derivatives are mathematical languages which are now almost universally utilized to explain and understand the philosophies underlying science and engineering. While there are notable exceptions, engineers and scientists, whether those scientists are physical scientists or social scientists, quantify the phenomena with which they are concerned so as to provide some common ground allegedly understood by at least those who appreciate the language of mathematics. In the modern world, a person may have a magnificent mechanical aptitude or an innate understanding of economics, politics, and sociology; but, without an understanding and appreciation of algebra, massive quantities of information are simply unavailable to that person. Worse still for everyone, that person is quite likely to be ignored.

In order to widen the participation of people in a modern society, it is necessary for as many people as possible to have an understanding and appreciation of quantitative concepts. After a person has acquired some facility with arithmetic, the next level is algebra. Algebra is used as a vehicle to understand not only chemistry, physics, engineering and economics, but also music, biology, sociology and even politics. In politics, for example, a voter who is interested in the election of only one candidate, and who has some familiarity with algebra, can more readily appreciate that on a ballot having five candidates on which the voter is allowed to vote for three, only one vote should be cast, since a vote for the two other candidates might diminish the chances of that voter's candidate prevailing. A child who might aspire to being a chemist, physician, engineer or corporate executive, has his or her chances severely comprised if that child does not understand algebra, since without an understanding of algebra, it is highly unusual for a student to succeed in trigonometry or calculus. In our society, algebra is a gate which must be opened in order to understand the language in which many other concepts are taught; and it is generally agreed that the more people who traverse the algebraic gate, the more knowledgeable a society, in general, becomes.

It is believed by many who have studied the subject that current methods of teaching algebra to children, as well as to adults, are counter-intuitive and defy common sense. Accordingly, many people are of the opinion that it is not in their best interest to learn algebra even though in the general scheme of things, people who understand algebra, or who have understood algebra, appear as a group to be better off than those who do not understand algebra. For the most part, it appears that those who do understand algebra would like to keep it that way, which is only natural. Some think that restricting access to such knowledge is counter-productive and would like as many people as possible to understand the language of algebra. They have undertaken activities such as the ALGEBRA PROJECT™ in order to include as many people as possible in the circle of those who understand and appreciate algebra.

In teaching algebra, a difficulty appears to arise when a student attempts to make the transition from arithmetic to algebra. To facilitate this transition, a discipline known as "pre-algebra" has arisen. It is the opinion of some people that pre-algebra is more difficult to teach and progress in than actual algebra because pre-algebra requires an understanding of numbers which is not readily apparent from the exercises that one undertakes to understand and appreciate arithmetic. Accordingly, there is a need for vehicles that convey these understandings and thereafter smoothly merge these understandings with classical algebra while providing insight into more sophisticated concepts.

SUMMARY OF THE INVENTION

It is a feature of this invention to provide a new and improved game for teaching mathematical concepts and skills.

The present invention is directed to a series of games for teaching mathematical concepts and skills. The game utilizes a lattice which includes legs configured in lattice arrays extending from a central point. Each lattice array includes three legs, and each lattice array extends from a terminus of another lattice array to a terminal point. A plurality of number chips having numbers thereon for factoring by the players are supplied, as well as input/output tables, each having an area for recording the prime factors of the numbers on the number chips and an area for providing an output value in accordance with selected rules. The output values define a path on the lattice. A frequency table is provided for receiving the numbered chips. The frequency table is an arrangement for sorting the number chips in accordance with the output values of the numbers on the number chips.

In accordance with one aspect of the invention, the output values are defined by the indicia "−1", "0" and "+1", which indicia "−1", "0" and "+1" are placed on each leg of the lattice.

In accordance with another aspect of the invention, a Venn diagram puzzle is included with a plurality of Venn diagram chips, each identifying a different color. Dice having colors associated with the chips are cast in order to provide prime numbers which are strategically placed in the Venn diagram puzzle until it is filled with the Venn diagram chips. The input/output tables are used to identify paths from the center point of the lattice to the terminal points of the lattice.

In accordance with still further aspects of the invention, the lattice is a two-dimensional lattice; and, in accordance with yet a further aspect of the invention, the lattice is three dimensional. Both two- and three-dimensional lattices include a series of "routes" defined by the legs of the lattice. The two-dimensional lattices have a series of "routes" having 3, 9, 27, 81, 243 . . . routes per lattice. Corresponding to each of these lattices is a three-dimensional lattice. The three-dimensional lattices provide a structure for exploring both binomial and trinomial expansions using games of chance that involve statistics and probability, thereby merging in an algebraic framework a number of mathematical concepts.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views and wherein:

FIG. 4 are input/output tables also referred to as "output flags";

FIG. 7 is a lattice route chart;

FIG. 8 is a Venn Diagram puzzle;

FIG. 9 are dice used in conjunction with the Venn diagram of FIG. 8;

FIG. 10 is a chart for recording the results of casting the dice of FIG. 9 and the results assigning values accordingly to the Venn diagram chips of FIG. 8;

FIG. 16 is a view of a three-dimensional lattice having three levels instead of four levels as is the case with the lattice of FIG. 12;

DETAILED DESCRIPTION

Figure 1:
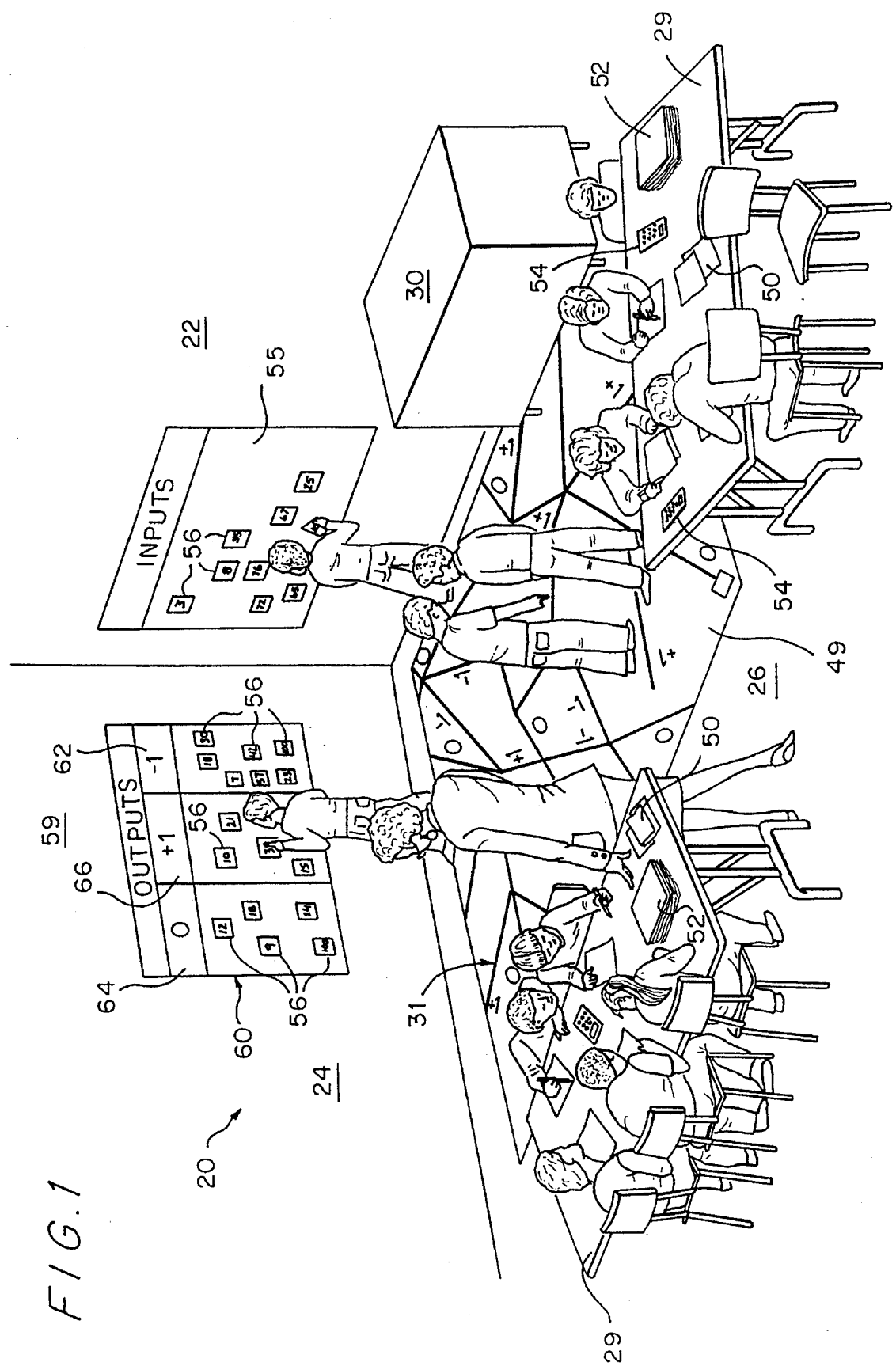
FIG. 1 is a perspective view of a classroom in which the game in accordance with the present invention is played.

Referring now to FIG. 1, there is shown a classroom 20 which provides a space for playing the game in accordance with the principles of the present invention. The present invention involves moving students around in a room as they play the game so that they may physically experience the concepts involved in the game. The classroom 20 includes at least a first wall 22 and a second wall 24, as well as a floor 26. The classroom also includes areas 28 with desks or tables 29 where students, who may be organized in teams, congregate when playing the game and a station 30 where a teacher who serves as a judge and referee sits. The game may be played by a few students or relatively large numbers of students and to date has been played by up to One hundred fifty people simultaneously, including students' parents. The upper limits as to the numbers of participants in this game have yet to be established; however, it is envisioned that through computer networks, the game could be played simultaneously by thousands of people. Since the game appears capable of generating excessive enthusiasm, the number of people gathered to participate at a single location should perhaps be limited.

Returning now to the single classroom 20 of FIG. 1, the location of various elements around the classroom requires that the students move around the classroom as they play the game and thus encourages them to remain conscious as they participate. Since the game requires team conferences, consultations and decisions, the atmosphere inside the room 20 frequently resembles the floor of a commodity exchange rather than the atmosphere of the traditional staid classroom.

Figure 2:
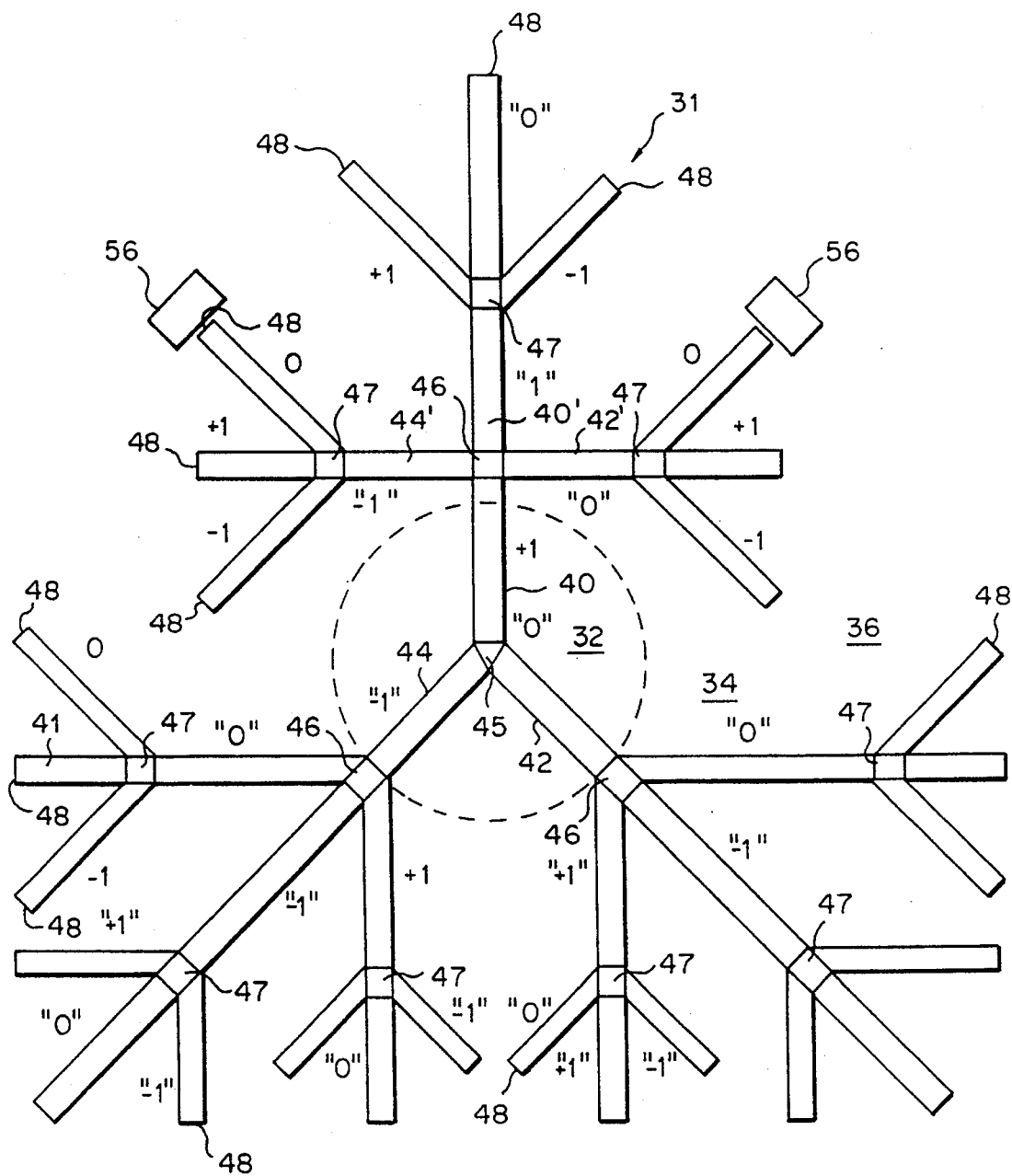
FIG. 2 is a plan view of a lattice known as a FLAG-WAY™ which, in accordance with one embodiment of the present invention, is placed on the floor of the classroom illustrated in FIG. 1 and duplicates of which are distributed to students as worksheets.
Figure 3:
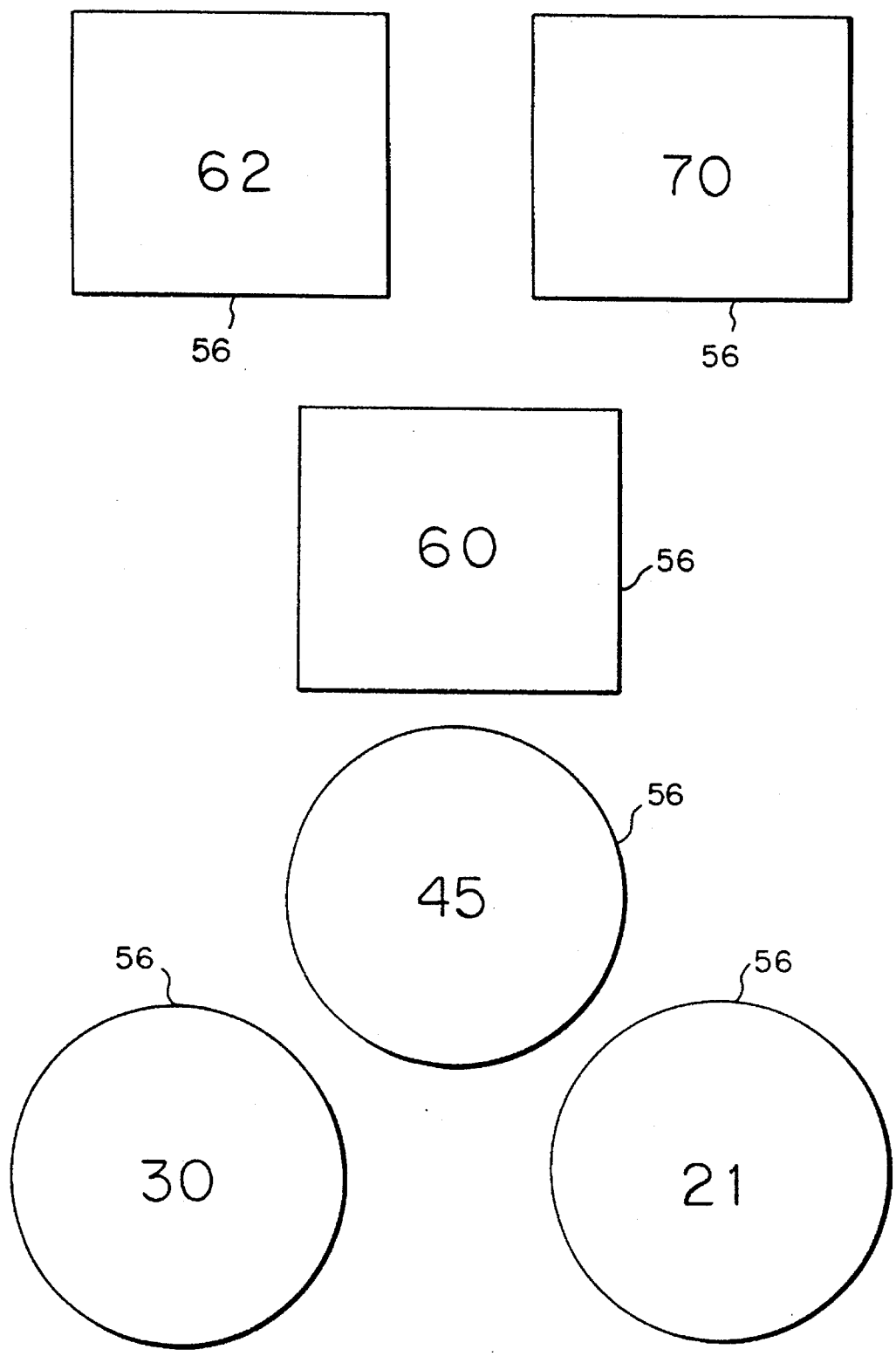
FIG. 3 is a view showing a plurality of POST-ITS® with numbers thereon referred to as number chips.

Referring now to FIG. 2, there is shown a two-dimensional, multicolored lattice 31 comprised of first, second and third zones 32, 34, and 36. In the zone 32, there are three legs 40, 42, and 44 radiating from a starting point 45. The leg 40 is identified with output "+1", the leg 42 is identified with the output "0", and the leg 44 is identified with the output "−1". The legs 40, 42, and 44 in the area 32 are each green in color. In the next area 34, there are three legs which project from nodes 46 at the end of the legs 40, 42 and 44. The outputs "+1", "0", and "−1" are repeated in the area 34 for the legs 40', 42' and 44'. There are three times as many legs 40', 42' and 44' as there are legs 40, 42 and 44. All of the legs 40', 42' and 44' are yellow in color. Finally, at nodes 47, legs 40', 42' and 44' branch again each into three legs 40" representing the output "+1", 42" representing the output "0" and 44" representing the output "−1". There are three times as many legs 40", 42" and 44" in the area 36, and these legs are all red in color. Accordingly, in area 32, there are three legs; in area 34, three is squared so that there are nine legs; and, in area 36, there are 3×3×3 or 27 legs, i.e., $3^3$. At the end of the legs 40", 42" and 44", there are terminal points 48.

The lattice 31 of FIG. 2 is instructional in and of itself in that it resembles a number of things such as the branches or root system of a tree, the structure of a snowflake or perhaps another crystal, a flow of information, as well as a myriad of other phenomenon. In order to enhance its significance to the student, the lattice 31 is placed on the floor 24 of the classroom in the form of a rolled-out mat 49. Each student playing the game is provided with an uncolored replica of the lattice 31 on a worksheet paper. The student then colors the legs 40–44" on the replica to resemble the color scheme of the lattice 31 on the mat 49 placed on the floor 24 of the classroom 20.

First Embodiment of the Invention
(First Version)

Each student receives a green, yellow and red magic marker to color the replica of the lattice 31 of FIG. 2 at the student's desk. On scratch paper, students practice factoring using the factor tree method wherein a number is selected and oblique lines are drawn from that number to the factors of the number. For example, if the number is "60", then a first pair of lines is drawn to the numbers "2" and "30." Since "2" is a prime number, it cannot be further factored, but the number "30" can be further factored and is factored into "2" and "15." The number "15" is factored again into the numbers "3" and "5", both of which are prime numbers. Students practice until they have a reasonable understanding of the arithmetic concept of prime numbers. There is a finality to factoring a number into its prime factors, which finality apparently gives people pleasure, as well as motivation, to attach further significance to the prime numbers they have uncovered.

Referring again briefly to FIG. 1, it is seen that each student has at his or her desk a plurality of input/output tables 50 (see FIG. 4), a score sheet 52 (see FIG. 6), an optional calculator 54, and a replica of the lattice 31 (see FIG. 2). At one location 55, on the wall 22 of the classroom 20, number chips 56 are adhered. Each number chip 56 is on a POST-IT® and has a separate number thereon. There may be, for example, numbers from "1" to "99." If desired, larger numbers may also be used; but, for pre-algebra students, numbers "1" to "99" are probably preferable. The numbers may be arranged in any order or may be randomly affixed in the location 55.

Figures 5, 6:
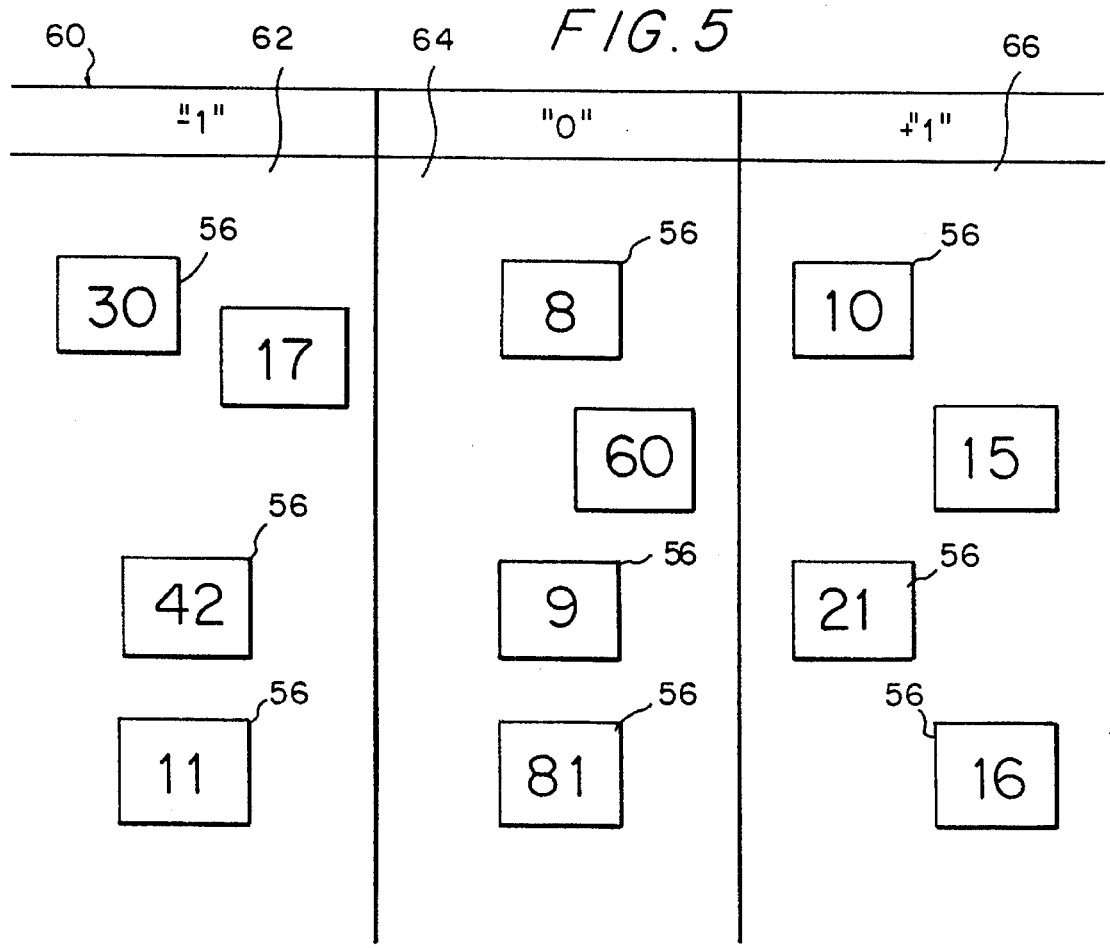
FIG. 5 is a frequency table for retiring the number chips of FIG. 3 after the number chips have been processed by a student using the input/output tables of FIG. 4.
FIG. 6 is a score sheet used to score games which are played in accordance with the structures set forth in FIGS. 1 through 5.

Located at a separate location 59 on wall 24 of the classroom 20 is a frequency table 60 for retiring the number chips 56 after the numbers on the number chips have been processed by playing the game. As is seen in FIG. 5, the frequency table 60 has a first column 62, which is given the output value "–1"; a second column 64, which is given the output value "0"; and a third column 66, which is given the output value "+1".

Considering the game in general, the game is played in teams, and the object of the game is to correctly place as many input/output tables 50 as possible on the lattice 31. Another object is to correctly place as many number chips 56 correctly in the columns 62, 64, and 66 of the frequency table 60. Preferably, 20 to 25 people play on one lattice 31 with 4 to 5 players per team. To initiate the game, players select three number chips 56 and fill out a single input/output table 50. One input/output table 50 at a time is presented for the judge at table 30 to review. The judge checks the input/output table 50 to see if it is filled out correctly, and, if it is not filled out correctly, the player returns to the team area to make corrections. Any team member may help with the corrections. Once the correction is properly made, the player writes the input number from the number chip 56 in the input column of the flag score sheet 52 (see FIG. 6) and the output value "–1", "0", or "+1" in the output column of the score sheet. Preferably, the teacher or judge at table 30 does not help the student make a correction but rather merely identifies the error. The student relies on team members to make the correction. If the "correction" is incorrect, the entire team assumes the blame so that no individual student is shamed.

Considering the game now in more detail, to initiate the game, the teacher utters some remark such as "GO!", and the students rush to the area 55 to select three number chips 56. The students then return to their desks 29, turn over single input/output tables 50 and factor the numbers on the number chip 56 using the factor tree method for each number chip selected. As is seen in FIG. 4, the input/output tables 50 are divided into an input column 70, a prime factors column 72, and an output column 74.

As is seen in FIG. 4, the numbers on the number chips 56 are placed in the input column 70. In the illustrated example, the numbers selected are the numbers "30", "15", and "8." These numbers may, of course, be any of the numbers on the number chips 56 selected. In the next column 72, the prime factors of these numbers, as determined by the students' number tree on the back of the input/output tables 50, are recorded. For example, the prime factors of the number of "30" are the numbers "3", "2", and "5." The prime factors of the number 15 are the numbers "3" and "5." The prime factors of the number "8" are the numbers "2", "2" and "2." According to the rules of the game, the output listed in the output column 74 is determined by a selected property of the prime factors. If the prime factors are "odd" in number, the output will be "–1". If the prime factors are "even" in number, then the output is "+1". If there are duplicate prime factors, indicating that a number has been raised to a power, then the output is "0". These assigned properties of prime factors are prescribed by the rules of the game to familiarize the students with the concept of negative and positive direction, After filling out the input/output table 50, the student checks with the teacher or judge at desk 30, who determines if the prime factoring and output numbers have been correctly placed on the input/output table. If not, the teacher returns the student to the team, and the team reviews the mistake. The judge merely says whether the factoring has been done correctly, and the students correct the mistake. One student on each team then takes the corrected input/output table 50 and walks the output on the lattice 31 (located on mat 49 on floor 26) utilizing the outputs "–1", "+1", and "0" as directional instructions. The input/output table 50 is then placed like a "flag" at one of the terminal points 48 on the lattice 31. In accordance with the present practice of the invention, the input/output tables 50 are adhered with tape adjacent the appropriate terminal points 48.

The student then takes the number chips 56 and places or "retires" them in the frequency table 60 on the wall 24 in accordance with the output associated with that number. As is seen in FIG. 5, the number chip 56 having the output number "30" would be retired in column 62 of the frequency table 60 because it has an output value of "–1". The number chip 56 having the input number "15" is retired in column 66 of the frequency table 60 because it has an output value of "+1." The number chip 56 having the input number "8" is retired in the output column 74 because it has a output value of "0".

It is emphasized that two slips of paper or "flags" are placed in the frequency table by each student during each "round" of the game, the first being the input/output table 50 adhered (temporarily) to the end points 48 of the lattice 31 on mat 49 and the number clips 56 adhered (temporarily) to the frequency table 60 on the wall 24. POST-IT® paper slips are a preferred, readily available, and inexpensive form for the number chips.

The game is played either for a time limit or continuously until all of the number chips 56 are depleted from the area 55 on wall 22 and deposited on the frequency table 60 located on wall 24. At that time, it is clear to the students that the game is over because there are no more number chips 56 in the area 55 because the numbers have been sorted by the students and organized in accordance with the rules of the game in the frequency table 60. The students then realize that even though numbers may be different, the numbers have at least one identical property that has been identified by processing the numbers in accordance with the rules of the game.

The students then fill in the score sheets 52. A suggested method of scoring is to provide 10 points for each input/output table filled out correctly, 10 points for each input/output table 50 which has been placed correctly at a terminal point 48 of the lattice 31 located on the floor 26, and 10 points for correctly placing a number chip 56 in the proper column 62, 64, or 66 of the frequency table. In order to facilitate scoring and to assign responsibility, the student signs each number chip 56 and input/output table 55 with his or her name and the team's name.

First Embodiment of, the Invention
  (Second Version)

In the first version, the students play the game with the teams organized as groups in which all team members participate simultaneously. In the second version, the game is played as a relay race wherein each team has four or six players. In this version, a pair of students select their number chips 56, fill out their input/output tables 50, walk the lattice 31 on the floor 26, place the input/output tables 50 at terminal points 48 of the lattice, and then retire their number chips in the frequency table 60. As each pair of players finishes these tasks, they return to their team to release two more players. The game continues until all of the number chips 56 have been removed from the area 55 and retired to the frequency table 60. As in any relay race, the team which finishes first wins, first in this case meaning the most correct answers.

Second Embodiment of the Invention

In the first embodiment of the invention, players are given input numbers 56 and are asked to find their outputs "−1", "0", "+1" (see Chart 60). Because the rule for assigning outputs is based on prime factorization, and prime factorization is unique, each input number is assigned a unique output.

In the second embodiment of the invention, players are given a "route" on the lattice 31 to capture. This means players have to find the input numbers 56 which have the outputs "−1", "0", or "+1" of the "route" they want to capture.

Second Embodiment of the Invention
  (First Version)

Two or more teams compete on the same lattice 31 to capture as many "routes" as they can. The twenty-seven different "routes" are listed on the lattice 31 chart of FIG. 7, on which teams sign off when a judge has approved a route capture of theirs or one of the team's route captures. (See the lattice 31 of FIG. 2 which serves as a route chart.) At this level, students are not given any help in finding input numbers 56 which have a certain output "−1", "0", or "+1". One method students use to find an input number 56 that has a specific output "−1", "0", or "+1" is to "guess and check". Students factor their "guess" to see if it gives the needed output.

Second Embodiment of the Invention (Second Version)

The second version of the second embodiment is similar to the first version but this time no input number 56 may be used more than three (or two) times. In this version, posted input numbers 56 are retired with the capturing of a "route". As it becomes more difficult to find "input numbers with the desired output, the "guess and check" method becomes less efficient. Some students discover that they can work with prime numbers to "construct and multiply" rather than "guess and check". This leads to the third version of this embodiment of the invention.

Second Embodiment of the Invention (Third Version)

The "construct and multiply" strategy involves the insight that strings of prime factors such as:

2, 3, 5

2, 3, 5, 7

2, 3, 3

19 etc.

define output numbers: in order from top to bottom −1, +1, 0, −1. It is thus easier to work with prime factors to "construct" input numbers 56 which have the desired output "−1", "0", or "+1".

Because prime factorization is unique, each such list of prime factors produces a unique input number:

2×3×5=30

2×3×5×7=210

2×3×3=18

19=19 etc.

Clearly, the "construct and multiply" strategy is available to any player who has grasped this critical role of prime factors in the construction of numbers. To help students grasp this role, the color-coded Venn diagrams 111 of FIG. 8 and color coded dice 110 of FIG. 9 are used. Each team has seven color coded dice 110 with three colors thereon. Since each die 110 has six faces, two faces are "black"; two faces are "blue" and two faces are "white". Each color is assigned a selected prime number by the teacher or judge 30 (FIG. 1). For example, black represents the number "2", blue represents the number "3", and white represents the number "5".

The Venn diagram puzzle 111 of FIG. 8 has seven colors. The yellow, green and red sectors 112, 114 and 116, respectively, are primary colors so that when they intersect one another by pairs, they produce the colors blue, purple and orange, identified by segments 118, 120 and 122. When all three primary colors intersect, they produce brown, which is identified by segment 124.

Now suppose a team rolls its seven dice and the colors lead to the prime numbers: 5, 5, 3, 3, 2, 2, 2. A team could use these to capture routes as shown in FIG. 10.

The dice 110 limit the prime factors available to the players, while the Venn diagrams 111 allow this fixed number of prime factors to be structured in various combinations to give the desired outputs. The idea of "common factors" is embedded in this activity, because a prime number becomes a factor of one, two or three input numbers according to its placement in the Venn diagram 111. The Venn diagram 111 helps to picture common factors through the color coding scheme described above.

This game can be played in a version in which two or more teams compete to capture "routes" on the same lattice 31, or teams work their own lattice.

Third Embodiment of the Invention

Figures 11, 12:
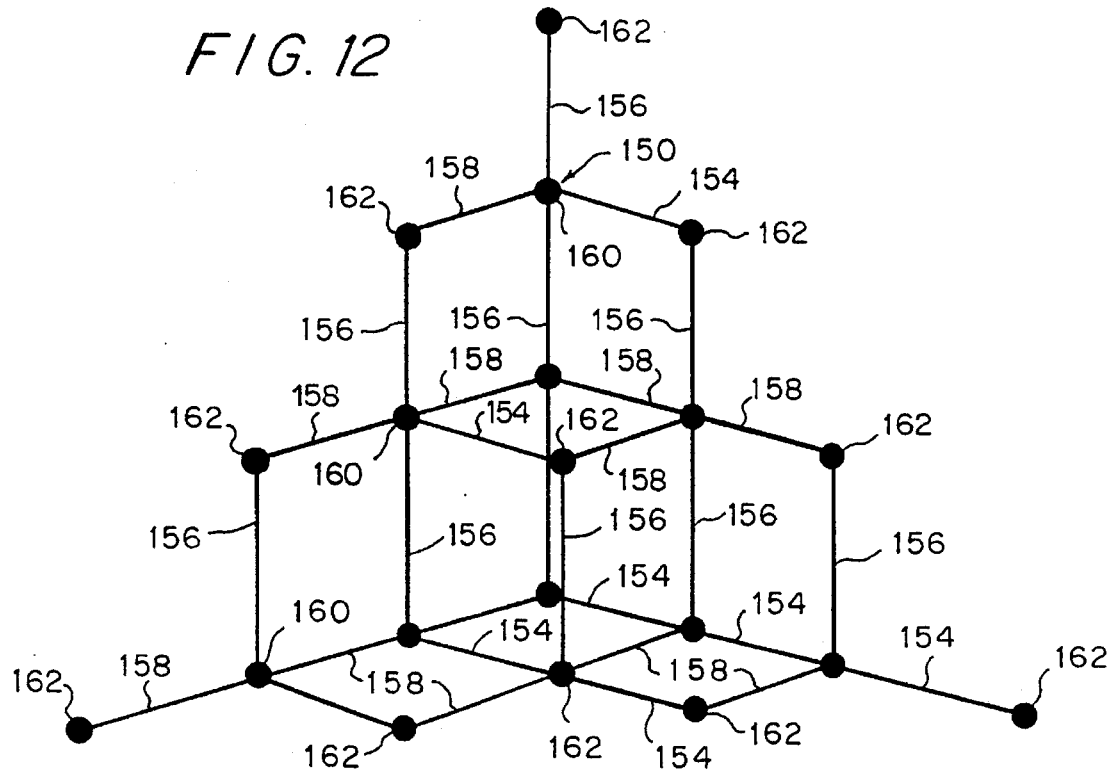
FIG. 11 is a chart illustration in which prime factorization of input numbers is used to construct an algebra form of that input.
FIG. 12 is a three-dimensional lattice.

For older students, all of the above versions of the first and second embodiments of the invention may be played with the following extension: the unique prime factorization of input numbers is used to construct an Algebra form of the input as is shown in FIG. 11.

In these versions of the game, students learn that it is the Algebra form of an input number that determines its output.

Fourth Embodiment of the Invention

Figures 13, 14:
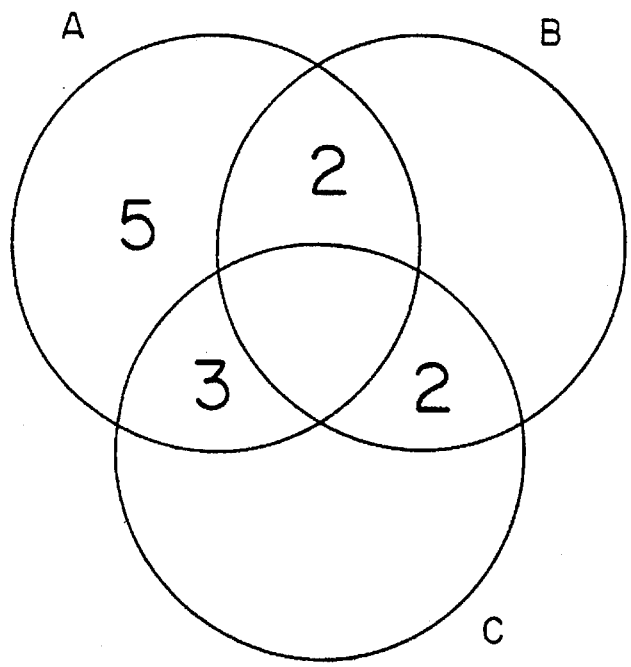
FIG. 13 is a "powers of three" table coordinated with colors used in the first embodiment of the present invention.
FIG. 14 is a chart illustrating nine pair of "directions" corresponding to two colors, with two numbers and nine routes on the lattice of FIG.

Referring now to FIG. 12, the three-dimensional lattice 150 has a structural correspondence to the two-dimensional lattice 31 of FIG. 2. This correspondence may be seen more clearly by considering extensions of the two-dimensional lattice and the corresponding three-dimensional lattice 150. The natural extensions of the two-dimensional lattice 31 are given in FIG. 13. Reading from top to bottom, each additional color defines a different two-dimensional lattice 31. As a color is added, an additional input number is added. Thus, the various embodiments of the invention described above could be played on the minimum two-dimensional lattice 31. One color, green, one input number, three routes given by the three "directions": $0, +1, -1$ which are the three outputs. Next would be the two colors green and yellow with two input numbers and nine routes given by nine pairs of "directions", as is seen in FIG. 14.

Next comes the configuration which has been the model up to now: three colors: green, yellow and red, with three input numbers and 27 triplets of "directions" of the lattice 31. If we have four colors, we use four input numbers which generate 81 four-triples of "directions". Then five colors use 5 input numbers which generate 243 give-triples of "directions". It is clear then that the colors in the two-dimensional structure track on lattice 31 track the number of inputs as well as the n-triples of the "directions" for routes.

On the three-dimensional lattice of FIG. 12, this information is not coded by color but by levels. Thus, the three-dimensional lattice 150 shown in FIG. 12 has four levels as shown in the FIG. 15. If we used only two colors, we would have three-dimensional lattices 150', as in FIG. 10'. This would have three levels as in FIG. 17. The numbers in the circles (to be explained below) add up to $9=3^2$, just as, in FIG. 15, the numbers in the circles add up to $27=3^3$.

Figure 18:
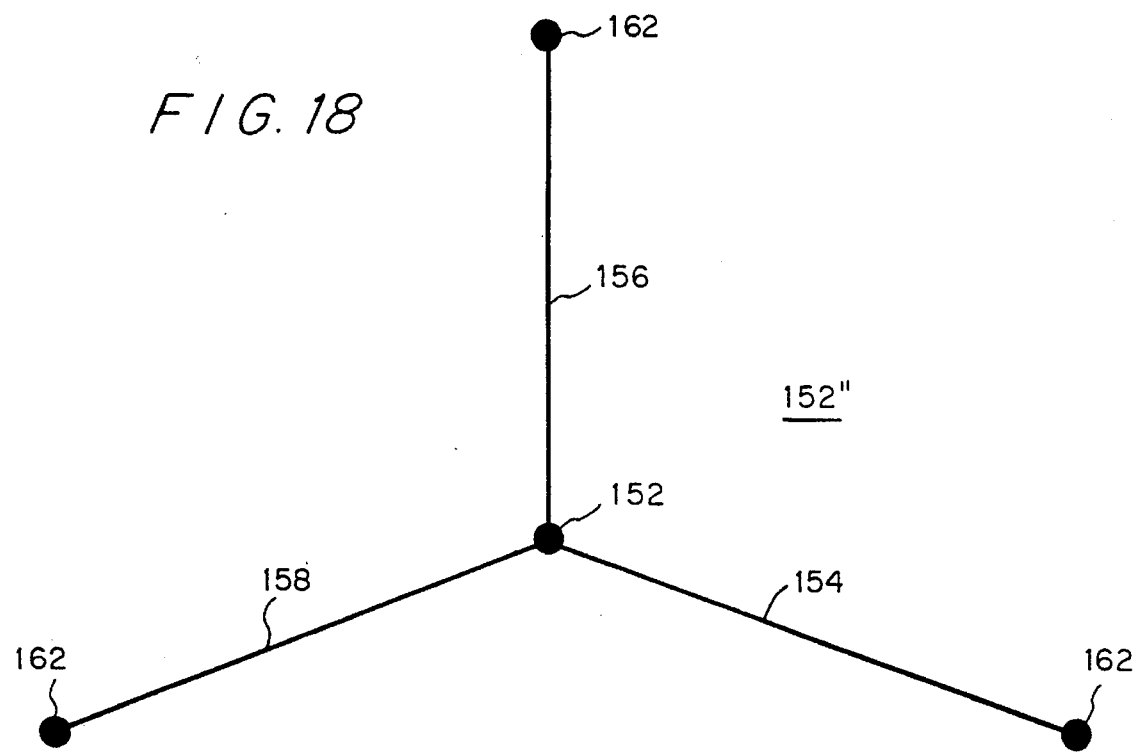
FIG. 18 is a view of a three-dimensional lattice having two levels.

If we used only one color, we would have a three-dimensional lattice 150" as in FIG. 18. This would have two levels, as in FIG. 19. The numbers now add up to $3=3^1$.

Figure 19:
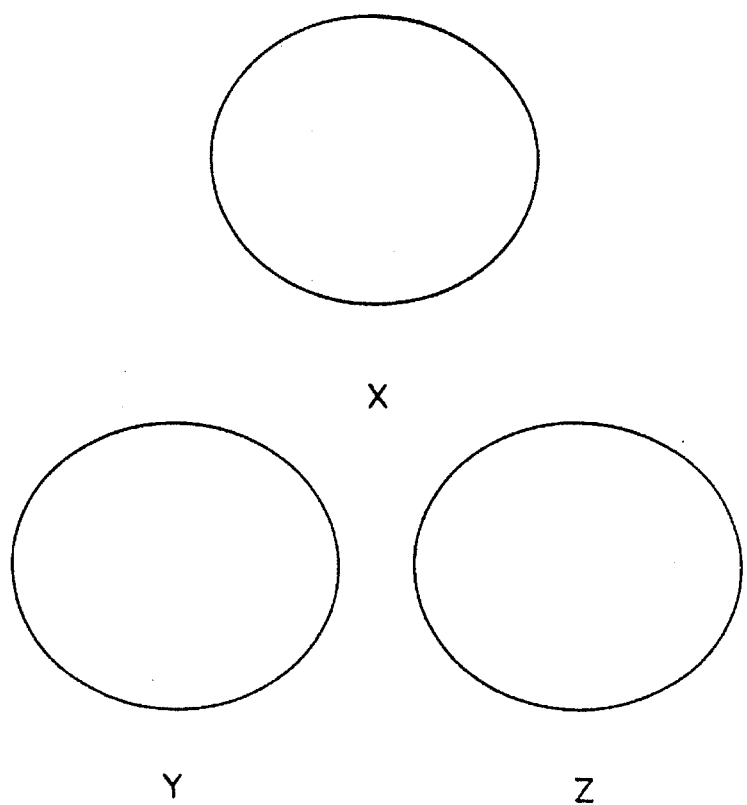
FIG. 19 is a trinomial tally table for the lattice of FIG. 18.

If we used four colors, then the three-dimensional lattice would add another tier, and we would have five levels. In the "Algebra" associated with the three-dimensional lattices 150, 150', and 150", the exponents in the trinomials keep track of the colors and associated number of inputs:

$(x+y+z)^1$ <--> two levels $(x+y+z)^2$ <--> three levels $(x+y+z)^3$ <--> four levels $(x+y+z)^4$ <--> five levels Level one, shown in FIGS. 18 and 19, for which there can be no game, would be $(x+y+z)^0=1$. The color coding on the three-dimensional lattice keeps track of the three outputs or "directions". This three-dimensional lattice 150 is comprised of an initial node 152, with parallel X direction legs 154, each of which is the same color, e.g., black; parallel Y direction legs 156, each of which is the same color, e.g., blue, and parallel Z direction legs 158, each of which is the same color, e.g., white. The legs 154, 156 and 158 are connected to one another by nodes 160 and end in terminal points 162. Thus, in the three dimensional lattice 150, the colors track the x, y, z directions (which are all one-way) which in turn track the outputs $0, +1, -1$ which are the direction indices of the two-dimensional Flagway.

| Color | Letter | Output |
|-------|--------|--------|
| Black | X | 0 |
| Blue | Y | +1 |
| White | Z | -1 |

First Version

The object of this game is to help students to understand how the three-dimensional structure relates to the two-dimensional structure. Two or more teams play against one another. The 27 routes are placed in a "hat" and each team takes a turn at selecting a route and "walking" it on the there as well as the two-dimensional lattices 31. A "walk" on the three-dimensional lattices 150 and 150' begins at initial node 152. We find there the three x, y, z directions. The walk proceeds along one of the x, y, z directions to a node 160. At any such node, we find the same three x, y, z directions, and the walk resumes along any one of these to another node 160. Again, the same x, y, z directions are present, and the walk resumes along any one of these to a terminal point 162. A flag is then placed at this terminal point. If it is correctly placed, the team wins points. The team that wins the most points for correctly placing flags on the two- and three-dimensional lattices 31 and 150 is the winner.

The three-dimensional lattice 150 is constructed so that the number of ways to "walk" to any terminal point 162 from the initial node 152 corresponds to the number of arrangements that are logically possible for the three outputs of that "walk".

For example, the outputs of three, two-dimensional routes:

(0, +1, 0);

(+1, 0, 0); and (0, 0, +1)

represent all the ways of arranging two zeroes and a positive one on a route. On the two-dimensional lattice 31, each of the above routes goes to a different terminal point. On the three-dimensional lattice 150, the corresponding three walks are coded as:

| x, y, x | or | black, blue, black |
| y, x, x |    | blue, black, black |
| x, x, y |    | black, black, blue | with each "walk" finishing at the same terminal point 162. In the "Algebra" of these "walks", this terminal point 162—in this case—represents the combination $X^2Y$, and the three ways to "walk" to this terminal point 162 represent the three permutations (arrangements) of the combination.

There are exactly three terminal points 162 that may be reached by "walking" in only one direction. These points correspond to the three routes of the two-dimensional lattice 31:

0, 0, 0

+1, +1, +1

-1, -1, -1, and they represent the terminal points 162: $X^3, Y^3, Z^3$, respectively. Accordingly, in the expansion of $(x+y+z)^3$, the terms $1x^3, 1y^3, 1z^3$ occur. Analogous to the output routes that correspond with the three permutations of $X^2y$, there are output routes, in groups of three, that represent the permutations of the combinations: $x^2z, y^2z, Xy^2, Xz^2, yz^2$. Accordingly, the expansion of $(x+y\ 30\ z)^3$ contains the terms: $3x^2y, 3x^2z, 3y^2z, 3xy^2, 3y^2z, 3xz^2$ and $3yz^2$. Finally, there is just one remaining terminal point 162. It is located exactly in the center of the three-dimensional lattice 150. To "walk", using all three directions is required. There are exactly six ways to do this, the six permutations of the combination xyz:

xzy yxz yzx zxy zyx

Figure 15:
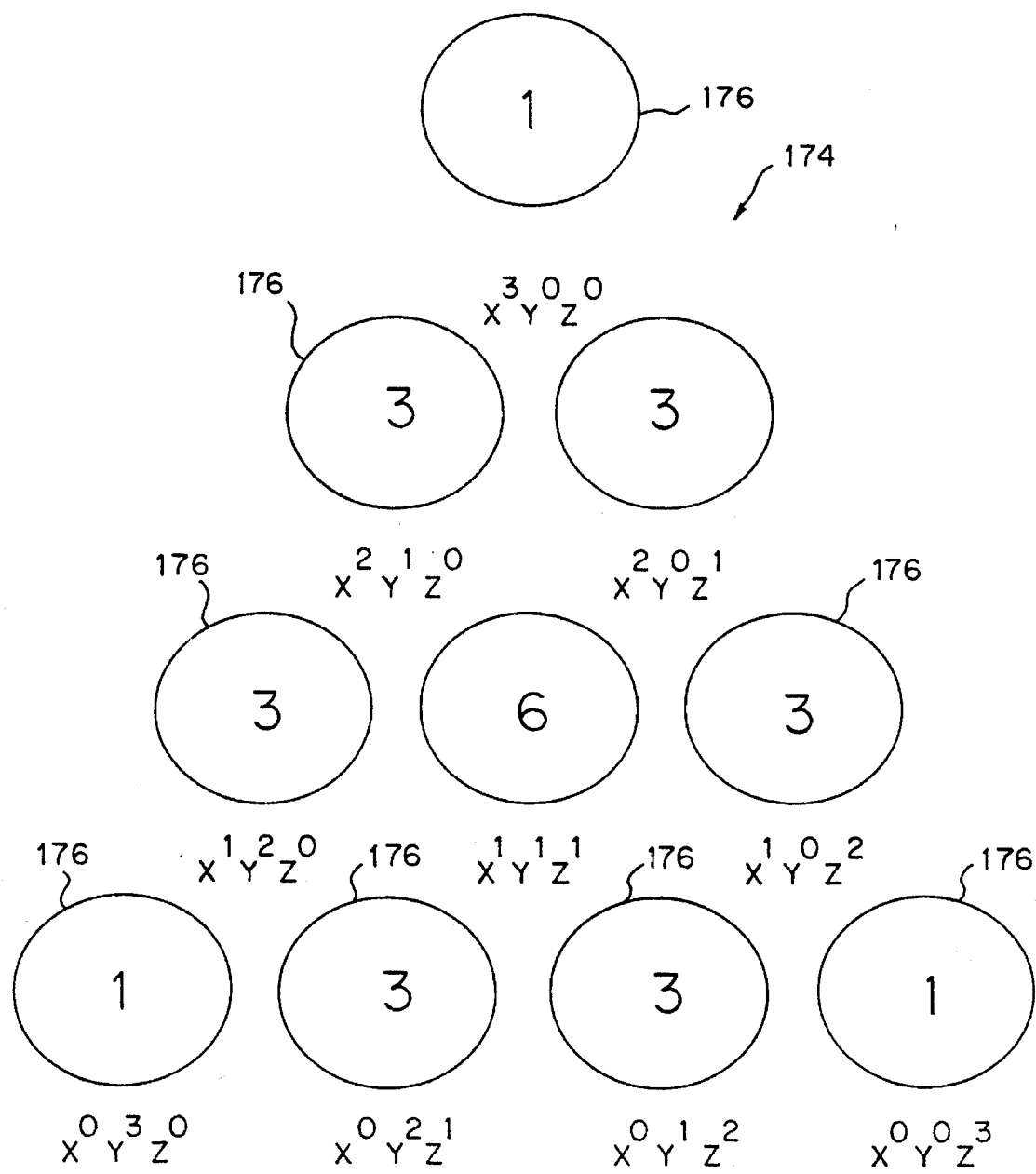
FIG. 15 is an illustration of a trinomial tally triangle showing the frequency distribution of XYZ combinations.
Figure 17:
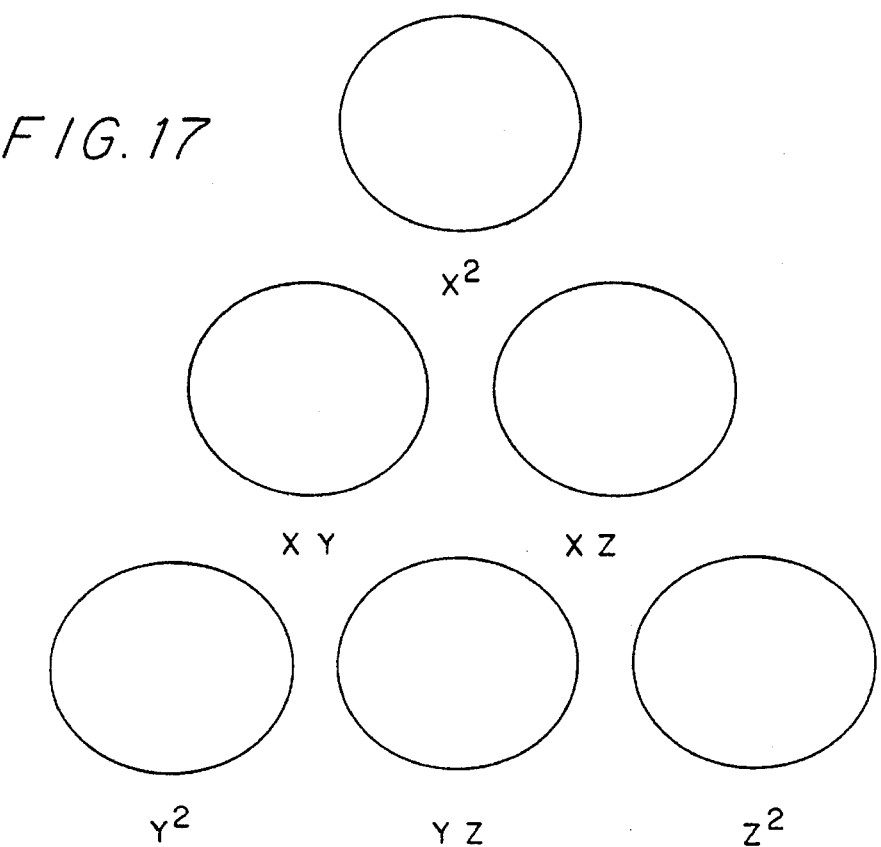
FIG. 17 is a trinomial tally table for the lattice of FIG. 16.

Accordingly, the expansion of $(x+y+z)^3$ contains the term 6xyz. All ten combinations are represented in FIG. 15. In this figure, the zero exponent means that the indicated direction was not chosen. Analogous combinations are represented in FIG. 17 and FIG. 19 without zero exponents.

This version of the game is finished when all the routes have been selected from the "hat" and worked on. The team which successfully completes the most "routes" and "walks" wins.

Second Version

There are many games of chance to play with the three-dimensional lattice. These games offer students arenas in which to explore statistics and probability in the context of trinomials.

Three dice color-coded black, blue and white, with opposite faces having the same color, are provided to each team. Each team rolls the dice and records the combination it rolls with a tally mark in the appropriate circle. The first team that rolls at least one tally mark in each of the circles brings the game to a close. In this version, the rolls should be public, and each team should tally every team's rolls. Judges keep their own tallies, and teams gain points by the accuracy of their tallies.

Third Versions

Figure 20:
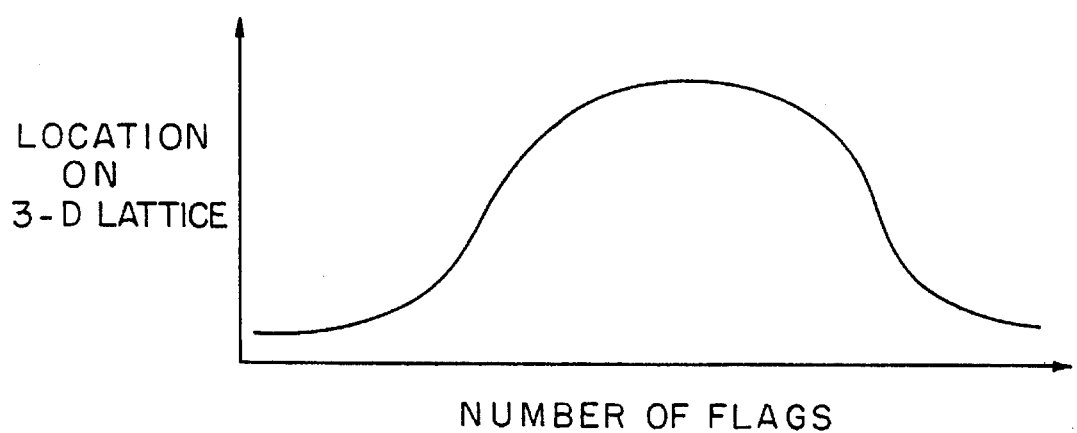
FIG. 20 is a standard distribution curve.
Figures 21, 22:
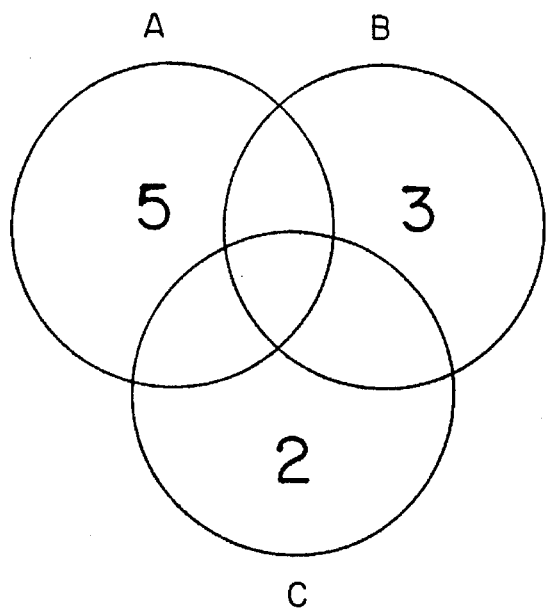
FIG. 21 is an illustration of a Venn diagram with assigned values for three circular areas.
FIG. 22 is an output chart for the Venn diagram of FIG. 21.
Figures 23, 24:
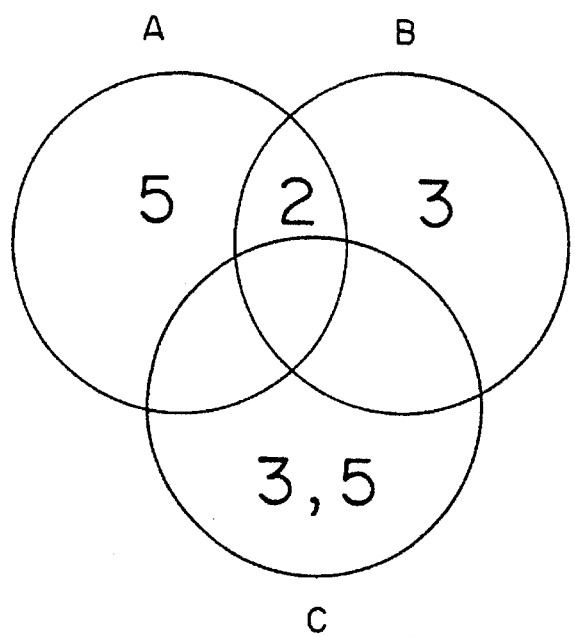
FIG. 23 is another embodiment of Venn diagram use.
FIG. 24 is an output chart for the Venn diagram of FIG. 23.
Figure 25B:
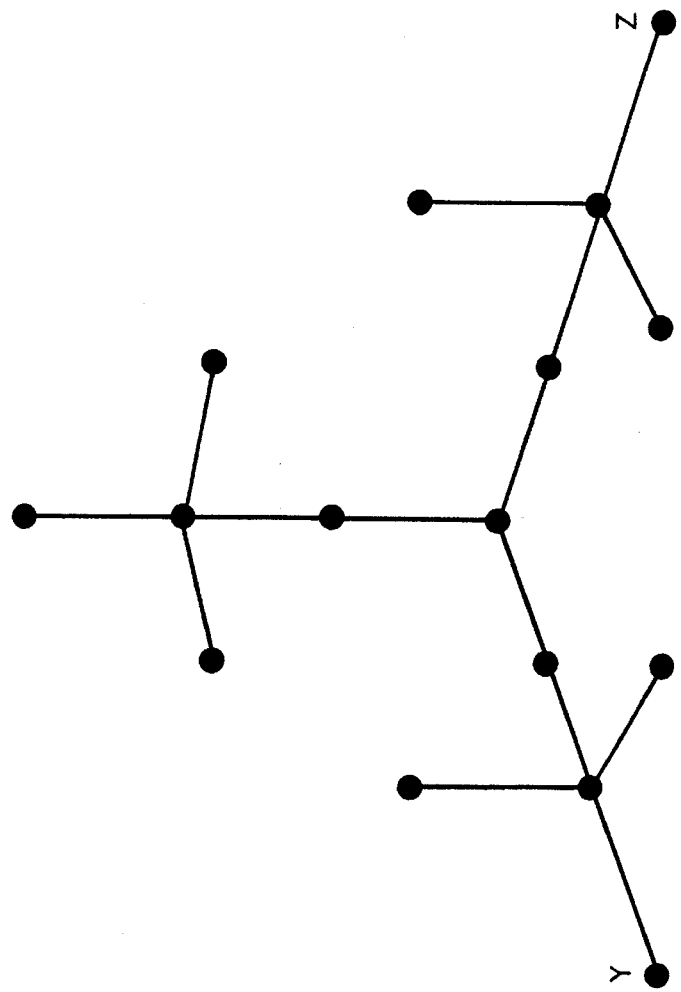
FIG. 25A–25J are prospective views of various lattice structures with algebraic expressions which correspond to those structures.
Figure 25A:
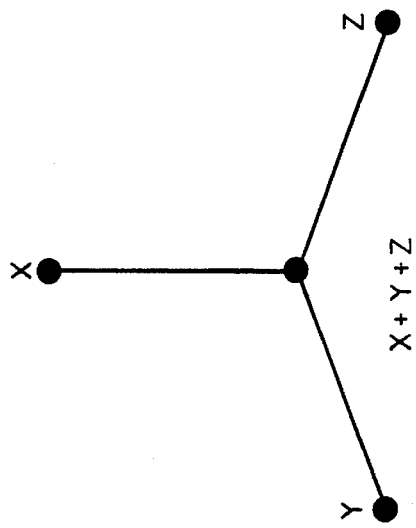
Figure 25C:
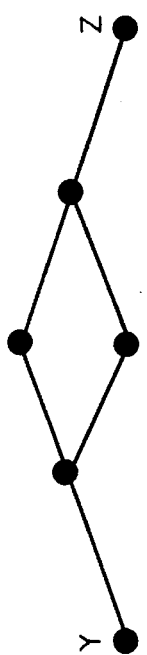
Figure 25E:
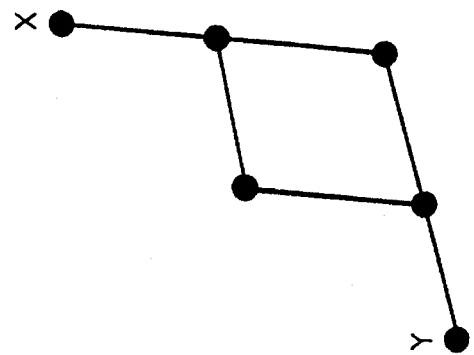
Figure 25D:
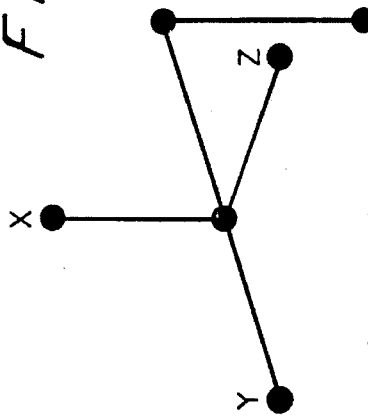
Figure 25F:
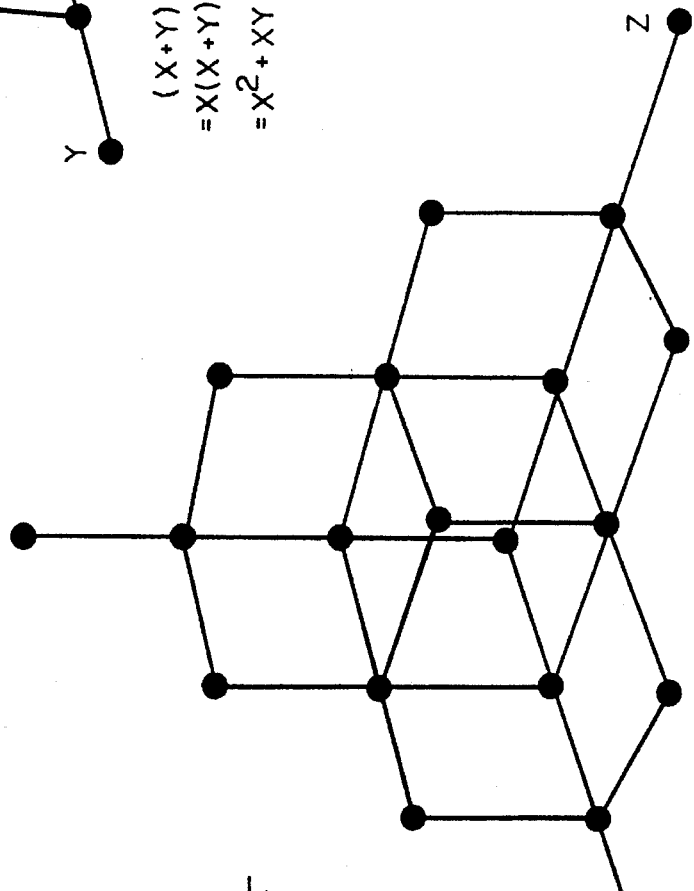
Figure 25H:
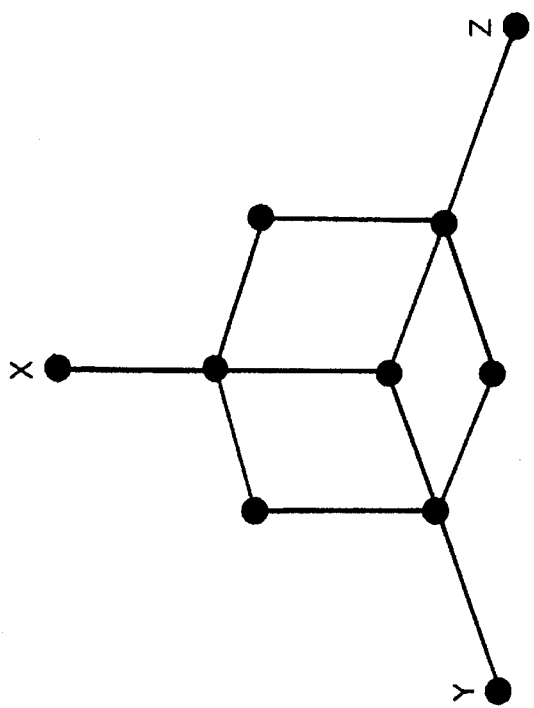
Figure 25G:
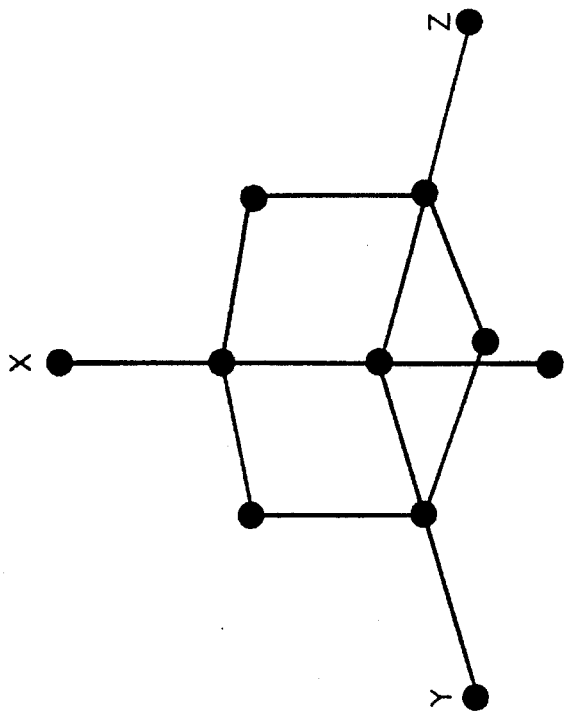
Figure 25I:
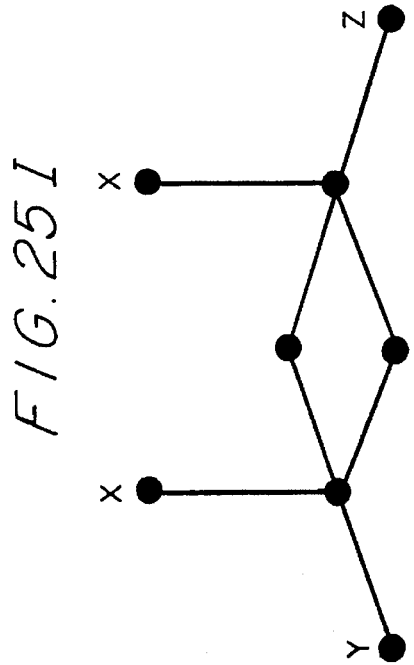
Figure 25J:
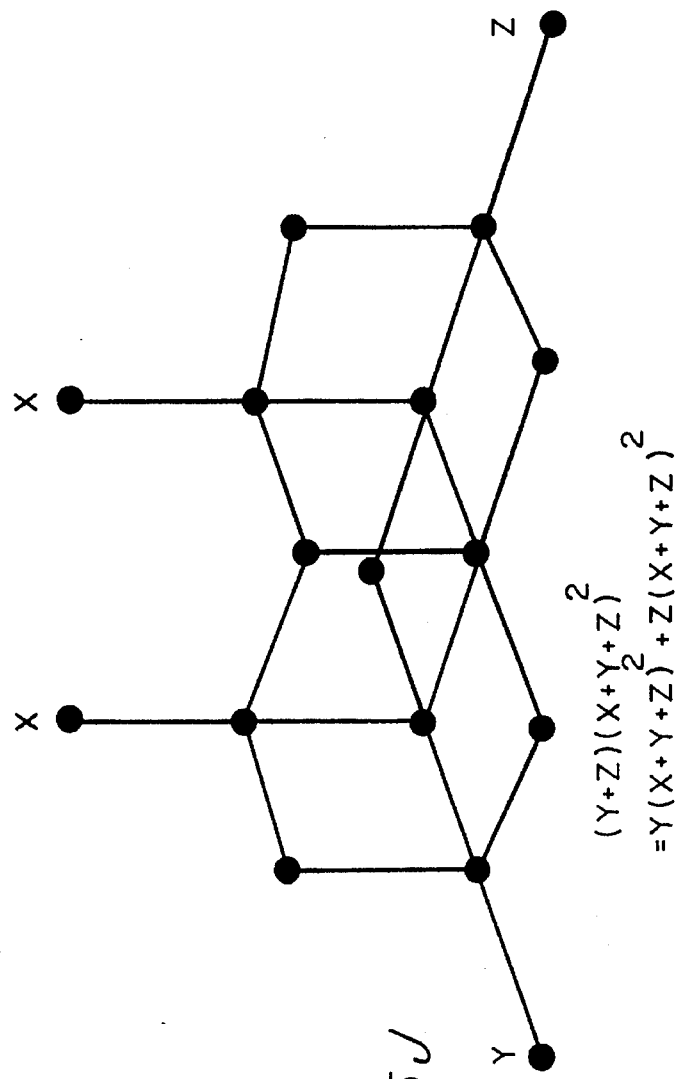

In these versions, we revisit the first and second versions and add tally sheets in which students record relative frequencies with fractions, decimals and percents. Thus, in the second version, the students' relative frequencies may be compared to the "expected" relative frequencies of the standard distribution, FIG. 20.

Fourth Version

In this version, the colors on the dice are assigned prime number values, e.g., 2, 3, 5. In this case, the expansion becomes $(x+y+z)^3=(2+3+5)^3=10^3=1000$. This may be viewed as 1000 points and teams compete to see which team rolls the most points (or which team reaches 1000 first). In this version, once a given combination has been exhausted, e.g., $X^2y$ rolled three different times, it cannot be counted for points. Again, the rolls should be public and each team keeps track of every team's total points, e.g.,

|  | Team | | |
| --- | --- | --- | --- |
| Dice | Black | Black | Blue |
| Directions | x | x | y |
| combination and its value | $x^2y$ $=(2)^2(3) = (4)(3) = 12$ | | |

As an entry level game, teams get points for each combination they correctly record. At a more competitive level, teams send representatives to judges' tables and the first (two or three) correct results get points.

Various Lattice Structures—FIGS. 25A–25J

Referring now to FIGS. 25A–25J, various lattice structures are shown with corresponding algebraic expressions. As students become increasingly familiar with the information embodied in the lattice 150 of FIG. 12, they may rearrange the legs 154, 156 and 158, nodes 152 and 160, and terminal points 162 of the lattice and then express those rearrangements in the algebraic expressions and expansions associated with each of the FIGS. 25A–25J. Conversely, the students may configure the lattices to conform to given algebraic expressions. The particular 10 arrangements of legs 154, 156 and 158 of FIGS. 25A–25J are merely exemplary of many lattice configurations which may be assembled using the legs and nodes in accordance with the principles of the present invention.

Figure 26:
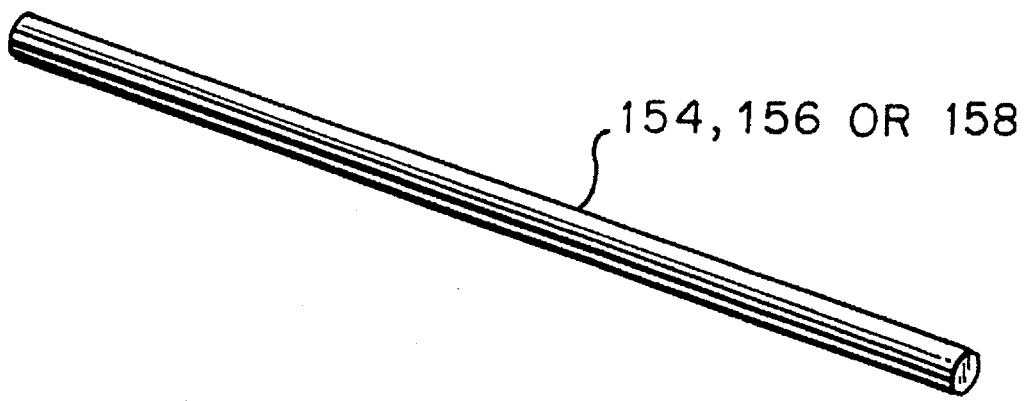
FIG. 26 is a leg used to form a component of the lattice structures of FIGS. 25A–25J.
Figure 27:
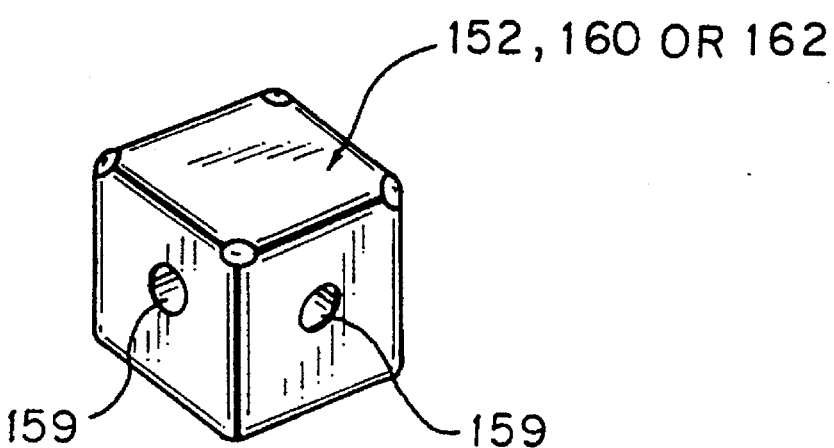
FIG. 27 is a perspective view of a node configured as a block with bores therein to receive the legs such as the leg of FIG. 26.

Preferred Lattice Components—FIGS. 26 and 27

Referring now to FIGS. 26 and 27, there are shown current configurations for one of the legs 154, 157 or 158 and one of the nodes 152, 160 or 162. Each of the legs 154, 156 or 158 is configured as an elongated dowel having ends which are received in bores 159 of the nodes 152, 160 or 116.

From the foregoing description, one skilled in the art can easily ascertain the essential characteristics of this invention and, without departing from the spirit and scope thereof, can make various changes and modifications of the invention to adapt it to various usages and conditions.

I claim:

1. A game for teaching mathematical skills and concepts, the game comprising:

a lattice including legs configured in lattice arrays extending from a central point wherein each lattice array includes three legs and wherein each lattice array extends from a terminus of another lattice array to a terminal point;

a plurality of number chips having numbers thereon for factoring by the players;

input/output tables having an area thereon for recording the prime factors of the numbers on the number chips and an area thereon for providing an output value in accordance with selected rules, the output values defining a path on the lattice; and a frequency table for receiving the number chips, the frequency table being arranged for sorting the number chips in accordance with the output values of the numbers on the number chips.

2. The game of claim 1, wherein the output values are defined by the indicia "−1," "0" and "+1".

3. The game of claim 2, wherein the indicia "−1," "0" and "+1" are placed on each leg of the lattice.

4. The game of claim 3, wherein the lattice is color coded with the three legs extending from the central point being a first color, the three legs extending from each of the first three legs being a second color and the three legs extending from the ends of the second legs being a third color, wherein the path through the matrix for positioning the input/output tables proceeds linearly from the first color, through the second color and through the third color through terminal points where the input/output tables are placed.

5. The game of claim 1, wherein the number chips and input/output tables are sheets of paper.

6. The game of claim 5, wherein the lattice is on a mat configured for laying out on a floor and wherein the players are each provided for an uncolored copy of the lattice for coloring in to resemble the lattice on the mat.

7. The game of claim 1, further including a Venn diagram puzzle with a plurality of colored chips, each identifying a different color and further including dice associated with the chips wherein the dice are cast in order to determine the order in which the Venn diagram puzzle is filled with the Venn diagram chips so that the input/output tables are used to identify paths from the center point of the lattice to the terminal points of the lattice.

8. The game of claim 1, wherein the lattice is a two-dimensional lattice.

9. The game of claim 1, wherein the lattice is three-dimensional and extends from a single "0" node with legs of the lattice extending in an X direction being a first color, legs of the lattice extending in a Y direction, normal to the X direction being a second color and legs extending in a Z direction normal to both the X and Y directions being a third color.

10. A device for teaching mathematical skills and concepts, the device comprising a three-dimensional lattice including an array of legs connected by nodes, the three-dimensional lattice being constructed and arranged with the legs radiating from a central node in at least three orthogonal directions with the legs extending in a first direction having a first indicia, the legs extending in a second direction having second indicia and the legs extending in the third direction having a third indicia, the nodes including connecting nodes for connecting legs to one another and terminal nodes.

11. The device of claim 10, wherein the first, second, and third indicia are first, second, and third different colors.

12. The device of claim 11, further including directional indicia indicating that movement along the legs is always in a direction away from the central node.

13. The device of claim 12, wherein the nodes each have connecting points for detachably connecting the legs thereto.

14. The device of claim 13, wherein the connecting points are holes in the nodes.

15. The device of claim 13, wherein the nodes are blocks with only enough holes to identify a position for each block as the central node, a connecting node or a terminal node.

16. The device of claim 10, wherein the device is a component of a game system further including a Venn diagram, dice and slips with numbers written thereon.

* * * * *